United States Patent [19]
Berges

[11] Patent Number: 5,902,072
[45] Date of Patent: *May 11, 1999

[54] MODULAR SEISMIC CABLE HANDLING SYSTEM WITH KNOCKDOWN CONTAINER

[75] Inventor: Larry Berges, New Iberia, La.

[73] Assignee: Regional Fabricators, Inc., New Iberia, La.

[*] Notice: This patent is subject to a terminal disclaimer.

[21] Appl. No.: 08/848,588

[22] Filed: Apr. 28, 1997

Related U.S. Application Data

[63] Continuation-in-part of application No. 08/527,630, Sep. 13, 1995, Pat. No. 5,624,207.

[51] Int. Cl.$^6$ .............................. F16L 1/20; F16L 1/235
[52] U.S. Cl. .............................. 405/173; 220/6; 405/303
[58] Field of Search .............................. 220/1.5, 6, 666; 405/168.1, 168.3, 158, 166, 165, 173

[56] References Cited

U.S. PATENT DOCUMENTS

| | | | |
|---|---|---|---|
| 5,415,311 | 5/1995 | Coogan | 220/6 |
| 5,542,870 | 8/1996 | Westersund | 220/6 X |

*Primary Examiner*—Tamara L. Graysay
*Assistant Examiner*—Tara L. Mayo

*Attorney, Agent, or Firm*—Joseph T. Regard, Ltd.

[57] ABSTRACT

A modular seismic cable handling system contained in a knockdown intermodal freight container, the freight container configured for secure containment and shipment of the system, as well as being configured to open to a platform designed to engage the main deck of a marine vessel, providing, with cable handling equipment contained therein, a relatively portable, self contained seismic cable handling system, on a vessel which may not specifically be designed for such an activity. The present invention may include a large wheel mounted in the front of the vessel for retrieving seismic cable from the water, a horizontally mounted cable handler comprising an eight wheel cable puller for pulling the cable from the wheel, urging same to the main deck level of the vessel, the cable puller comprising four pairs of tires configured for frictional, rotational contact another along their outer surface, to frictionally grab and pull a seismic cable along a linear path. The pulled cable is urged along a track running generally the length of the vessel, where a smaller, rear cable puller further urges the cable to the rear of the vessel. The present system further contemplates a trolley cable deployment system for deploying the cable into cable bins on the main deck for storage, as well as to sea, which trolley system includes a cable wheel puller arrangement having movement situated along the longitudinal axis of the container, allowing flexible placement of the cable in cable storage bins situated on the main deck area.

27 Claims, 13 Drawing Sheets

MODULAR SEISMIC CABLE HANDLING SYSTEM WITH KNOCKDOWN CONTAINER

STATEMENT OF RELATED CONTINUING APPLICATION

The present application is a continuation-in-part of patent application Ser. No. 08/527,630, issued Apr. 29, 1997 as U.S. Pat. No. 5,624,207, indicating as inventor Larry Berges. "Ocean Bottom Cable Handling System and Method of Using Same".

TECHNICAL FIELD OF THE INVENTION

This invention relates to cable handling systems, and in particular to a convertible marine seismic cable deployment and retrieval system for utilization in conjunction with a marine vessel which may not be specifically configured for seismic cable operations.

The preferred embodiment of the present invention teaches a modular seismic cable handling system contained in a knockdown intermodal freight container, the freight container configured for secure containment and shipment of the system. Further, the container is configured to open to a platform designed to engage the main deck of a marine vessel, providing, with the cable handling equipment, a relatively portable, self contained seismic cable handling system, on a vessel not specifically designed for such an activity.

The cable handling system of the present invention teaches a large wheel mounted in the front of the vessel for retrieving seismic cable from the water, and a horizontally mounted cable handler comprising an eight wheel cable puller for pulling the cable, urging same to the main deck level of the vessel, the cable puller comprising four pairs of tires configured for frictional, rotational contact another along their outer surface, to frictionally grab and pull a seismic cable along a linear path. A smaller rear cable puller further urges the cable to the rear of the vessel.

The present system further contemplates a trolley cable deployment system for deploying the cable into cable bins on the main deck for storage, as well as to sea, which trolley system includes a cable wheel puller arrangement having movement situated along the longitudinal axis of the container, which is in turn aligned with the along the longitudinal axis of the vessel, allowing flexible placement of the cable in cable storage bins situated on the main deck or other area.

BACKGROUND OF THE INVENTION

Although the prior art has contemplated various and diverse wheeled cable pullers, none have contemplated the system of the present invention. Marine seismic cable operations have in the past required the deployment of custom built, costly vessels specifically designed for seismic cable handling operations, which vessels were so specialized in design as to be largely dedicated to seismic operations only. Consequently, when seismic work was not needed, these dedicated seismic vessels would have to be moored, and exceedingly costly proposition.

The following patents are considered to be at least of general pertinence to the present invention:

| U.S. Pat. No. | Inventor | Date of Issue |
|---|---|---|
| 5,284,323 | Pawkett | 02/08/1994 |
| 5,217,176 | Hall | 06/08/1993 |
| 5,199,659 | Ziliblich, Jr. | 04/06/1993 |
| 5,197,716 | Zibilich, Jr. et al | 03/30/1993 |
| 4,596,492 | Monti et al | 06/24/1986 |
| 4,581,723 | Savit | 04/08/1986 |
| 4,570,245 | Thigpen | 02/11/1986 |
| 4,540,159 | Jordan | 09/10/1985 |
| 4,676,483 | Magill | 06/30/1987 |
| 4,581,723 | Savit | 04/08/1986 |
| 4,254,940 | Thyvold | 03/10/1981 |
| 3,843,096 | Wilson et al | 10/22/1974 |
| 3,719,348 | Wells | 03/06/1973 |
| 3,630,461 | Suganti et al | 12/28/1971 |
| 3,448,962 | Miller | 06/10/1969 |
| 3,093,333 | Bishop | 06/11/1963 |
| 2,659,549 | Galin | 11/17/1953 |
| 1,703,777 | Pernot | 02/26/1929 |

Regarding patents on foldable or knock-down intermodal-type cargo containers, the following patents may be of some pertinence:

| U.S. Pat. No. | Inventor | Date of Issue |
|---|---|---|
| 3130850 | Oakey | 04/28/1964 |
| 3223274 | Tolnai | 12/14/1965 |
| 3602388 | Hurkamp | 08/31/1971 |
| 3765556 | Baer | 10/16/1973 |
| 3796342 | Sanders et al | 03/12/1974 |
| 4214669 | McQuiston | 07/29/1980 |
| 4339039 | Mykleby | 07/13/1982 |
| 4860911 | Jones, Sr. | 08/29/1989 |
| 5284323 | Pawkett | 02/08/1994 |
| 5197716 | Zibilich Jr et al | 03/30/1993 |

U.S. Pat. No. 4,570,245, issued 1986 teaches in column 3, discussion of FIG. 3 (line 8) a tensiometer 32 comprising a sheave communicating with a cable, the sheave situated upon a linear path, and traversing that path in order to maintain constant tension on said cable. U.S. Pat. No. 4,581,723 teaches in large part the same invention as '245, and is attributed to the same inventor.

U.S. Pat. No. 4,540,159 teaches a cable tensioner operating along the same lines, but with vertical rather than horizontal linear movement of the sheaves. U.S. Pat. No. 3,448,962 also contemplates a vertically traversing sheave for tensioning.

U.S. Pat. No. 3,093,333, issued 1963, teaches a cable handling vessel having a retrieval ramp (5), a cable retrieval engine (4), and means to stow the cable below deck. Also included is a discussion (cols 1,2) of "lump" storage of cable on the deck.

U.S. Pat. No. 1,703,777 also contemplates a submarine cable deployment, retrieval system, including cable guide means for stowing same below deck. Also discussed is the problems with stowing cable in "lumps", and the associated tangling and knotting therewith.

U.S. Pat. No. 5,521,973, also issued 1996 to AT&T Corp., teaches a "Transport Apparatus for Large Network Telecommunication Equipment" teaching a transport apparatus having two cable storage bays, switch bays, and cross connect equipment, all hingedly affixed for deployment.

Several patents relate to collapsible and knock-down type intermodal containers, although most of these patents teach folding containers for the purpose of reduced space for storage, and not knock-down to serve as a platform for a specific task. See, for example, U.S. Pat. Nos. 4,214,669, 3,130,850, 3,223,274, 3,765,556, and 3,796,342.

As may be discerned by a review of the above patents, the prior art has failed to teach a cable handling system which may be implemented with a variety of vessels not particularly designed for seismic cable Lastly, the prior art has failed to teach or contemplate a cable trolley system which effectively directs cable into the main deck in lump storage, without knotting or binding.

GENERAL SUMMARY DISCUSSION OF THE INVENTION

Unlike the prior art, the present invention provides a convertible seismic cable deployment/retrieval system which is quicker, more efficient, and cost effective than earlier systems.

Unlike the prior art, the present system contemplates a containerized system which may be shipped via conventional intermodal transport to a destination, whereupon the system may be quickly and relatively inexpensively installed upon a variety of size and type vessels, converting same for seismic operations.

The preferred embodiment of the present invention utilizes at least one forty foot intermodal container to ship first and second container bins, which may have cable therein, and a cable trolley which is configured to move longitudinally along the length of the container. This main container appears on the exterior to be a typical intermodal shipping container, but is configured, once placed upon the deck of a vessel, to unfold to form a cable storage area, and include equipment for retrieval and deployment of seismic cable.

The preferred embodiment of the present system is specifically configured to handle bottom cable, which is more difficult to handle than other seismic cables. Nonetheless, the system is suitable for utilization in conjunction with all seismic cable operations.

The preferred embodiment of the present invention may be utilized in conjunction with a variety of vessels, including, for example, a 200 foot, general purpose, service vessel.

Exemplary cable which may be utilized could include, for example, 7,000 feet of bottom type, 1.4 inch diameter seismic cable, having four inch connectors.

The main container of the present invention includes a top wall which is split in the middle along its length, first and second side walls which are hinged at their base, and first and second ends which are removable In use, the vessel is prepared by clearing the main deck, and, when desirable, reinforcing the main deck via laterally spaced I-beams or the like. The main container is then placed upon the deck of the vessel, atop the I-beams when implemented, and then unfolded such that the end walls are removed, the split top is unlatched, and first and second side walls are hingedly manipulated at their base such that said first and second side walls rest upon the deck at opposing edges of the bottom wall of the container, opening the container upon the deck. The split top is configured to form first and second sidewalls of the cable bins when laid out, as will be shown.

The trolley, slidably situated along a support beam running along the longitudinal axis of the main container, which is aligned with the longitudinal axis of the vessel, is then made ready for operations.

With the preferred embodiment of the present invention, further preparation includes the installation of a retrieval wheel situated on one side of the vessel near the front, a cable puller adjacent to the retrieval wheel, a cable tray situated along generally the length of the vessel to direct the retrieved cable from the front to the general rear of the vessel, a rear cable puller to facilitate retrieval and deployment of the cable, a power plant when necessary, as well as an instrument and/or control room, which may likewise housed in shipping containers.

In use, the cable is designed to be stored and deployed from within the cable bins situated upon the main deck of the vessel via the trolley assembly and/or rear cable puller, deploying the cable into the sea as the vessel moves in a forward direction.

For retrieval, the vessel comes about such that the bow or forward portion of the vessel is adjacent to the end of the cable to be retrieved, and the end is hauled up such and passed through a bow retrieval wheel on the upper deck of the vessel, in the exemplary embodiment, located on the starboard side of the vessel.

From the retrieval wheel, the cable passes through a front cable puller, the cable puller mechanism specifically configured to pull seismic cable having connectors which may have a larger diameter than the rest of the cable, without the necessity of special wheel gripper spacing mechanisms.

The cable, once it passes through the front cable puller assembly, is guided along a cable tray system the length of the vessel, through a cable tray, wherein the cable further passes through a rear cable puller, and then to the trolley assembly, comprising a moveable wheeled cable puller configured to be maneuverable both along the longitudinal axis of the vessel, and can thereby be positioned throughout the cable bin area. The trolley, manipulates the cable in the storage bin into a pile or lump, along the length of the storage bin, beginning in the front and working back.

The cable pullers of the present invention contemplate the utilization of relatively oversized, under-inflated tires to allow for a softer, increased frictional contact with the cable, while allowing for the tires to "give" with the passage of cable connectors therethrough, which typically have a greater diameter than the cable, allowing for full, real-time cable retrieval without the necessity of having to individually spool the connectors through the wheel pullers, which typically was necessary with prior art cable handling arrangements.

Unlike the prior art, the present system allows for a relatively hands off, fully mechanical deployment and retrieval of the vessel, with only nominal personnel handling of the cable necessary. In the present embodiment, the cable puller mechanisms and trolley are controlled by personnel via control stations. An alternative embodiment of the present invention, however, provides for a fully automated control of the cable handling process, via sensor monitoring and control system.

The present system, requiring nominal manual interaction, is highly suitable for use under rough sea conditions, such as the North Sea, as well as extended deployments, which might typically deplete available personnel on board.

In addition, the present system provides a more versatile, less expensive, quicker, and more consistent cable deployment/retrieval cycle under any condition, due to the lack of extensive manual intervention.

It is therefore an object of the invention to provide a seismic cable deployment and retrieval system which is able to be easily shipped via standard intermodal shipping, and which may be installed on a variety of sized and type vessels to convert same for seismic operations.

It is another object of the present invention to provide a modular seismic cable handing system housed in a knockdown container which is convertible to form cable bins on the main deck of the vessel, with a main trolley situated along the length of said container.

It is another object of the present invention to provide a method of providing intermodal seismic containers which may be convertible to form specialized structures for facilitating an operation.

It is another object of the present invention to provide a system for rapid deployment and retrieval of seismic cable, in a manner which nonetheless is safe and non-damaging to the seismic cable.

It is still another object of the present invention to provide a cable deployment/retrieval system which may be utilized in relatively high seas.

It is still another object of the present invention which provides a more rapid deployment and retrieval of seismic cable than prior art systems.

It is still another object of the present invention to provide an automated system for deployment and retrieval of seismic cable.

It is another object of the present invention to provide a system for deployment and retrieval of seismic cable which may be utilized on longer mission intervals, with less crew, than prior art systems.

It is still another object of the present system to provide a seismic cable deployment and retrieval system which includes cable handling equipment which provides for efficient, non-damaging handling of the seismic cable, and which allows for the passage of larger diameter connectors therethrough without having to adjust the separation spacing of said equipment.

Lastly, it is an object of the present invention to provide for a lump storage of seismic cables in a manner which effectively prevents knotting or binding.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 4A provides an isometric, frontal view of the two wheel cable puller forming the cable pulling means of the cable trolley of FIG. 4.

DETAILED DISCUSSION OF THE INVENTION

Figure 1:
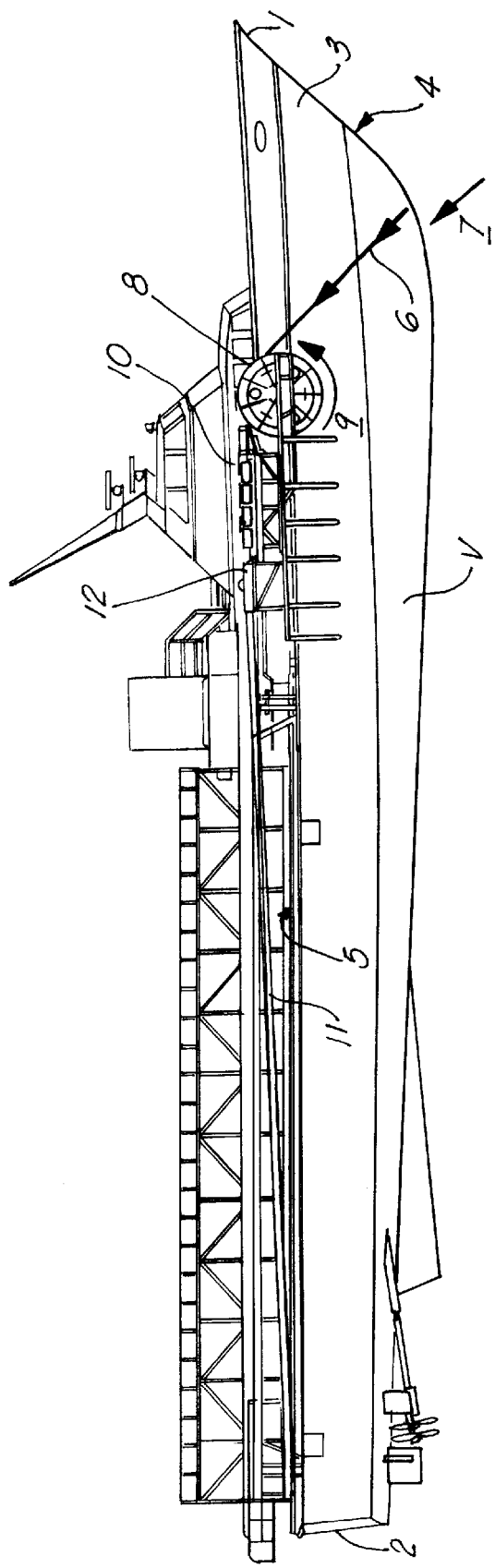
FIG. 1 provides a side view of the Modular Seismic Cable Handing System with Knockdown Container of the present invention, further illustrating an exemplary vessel upon which the system is mounted, as well as an exemplary cable during retrieval.

As shown in FIG. 1, the exemplary, preferred embodiment of the present invention is contemplated for utilization in conjunction with a vessel V having a bow 1 or forward end, a stern 2 or rear end, a port 4 and starboard 3 sides, and a main level deck 5.

The preferred embodiment of the present invention present system contemplates a modular cable handling system which may be containerized, allowing it to be shipped via intermodal transport to a destination, whereupon the system may be quickly and relatively inexpensively installed upon a variety of size and type vessels, converting same for seismic operations.

Figure 9:
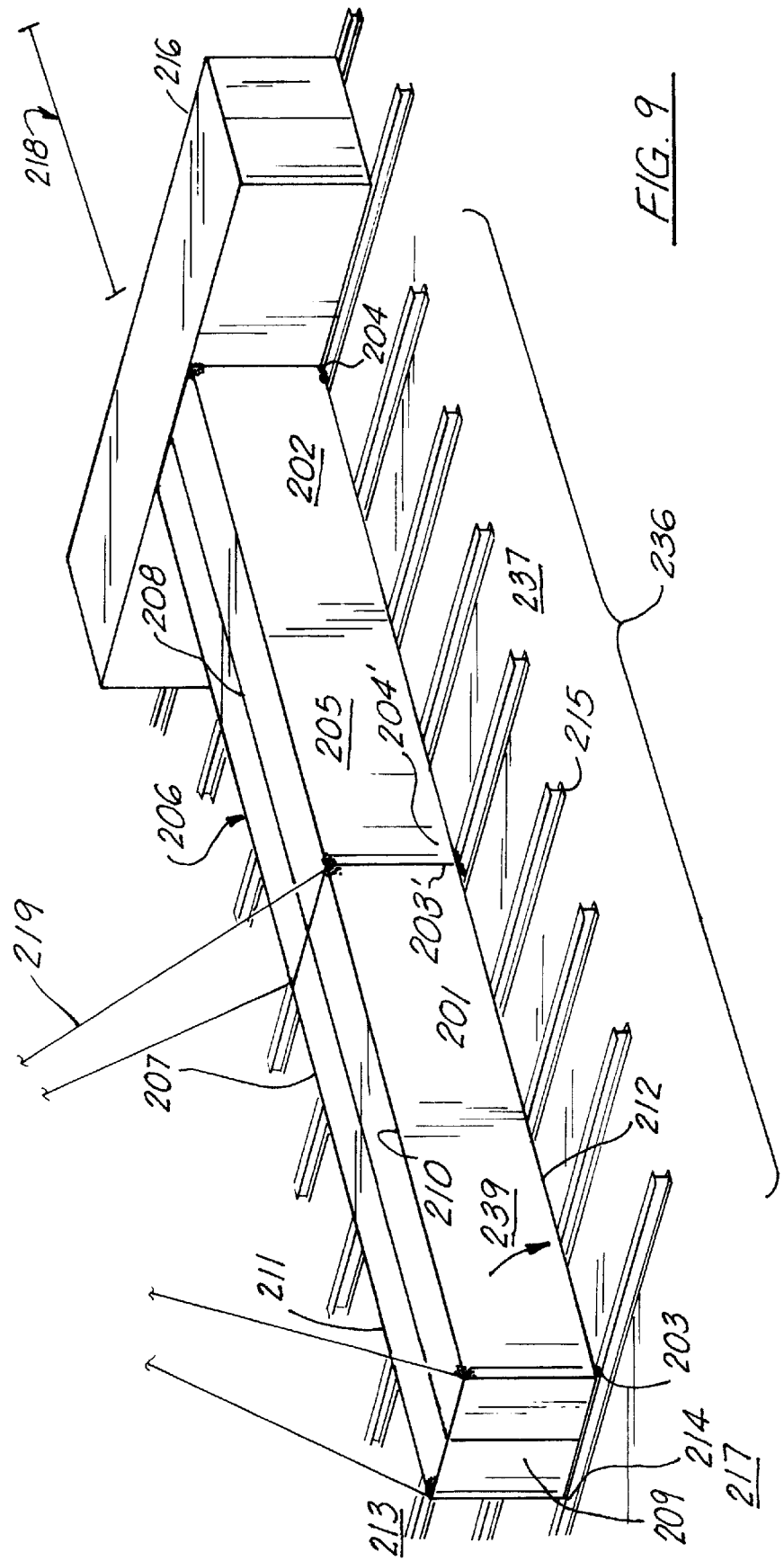
FIG. 9 provides an isometric view of the modular seismic cable handling system of claim 1, illustrating the preparation of the deck of a vessel with spaced I-beams for added support, and placement of a first and second, linearly aligned knock-down containers, and a third control/hydraulic room container.
Figure 10A:
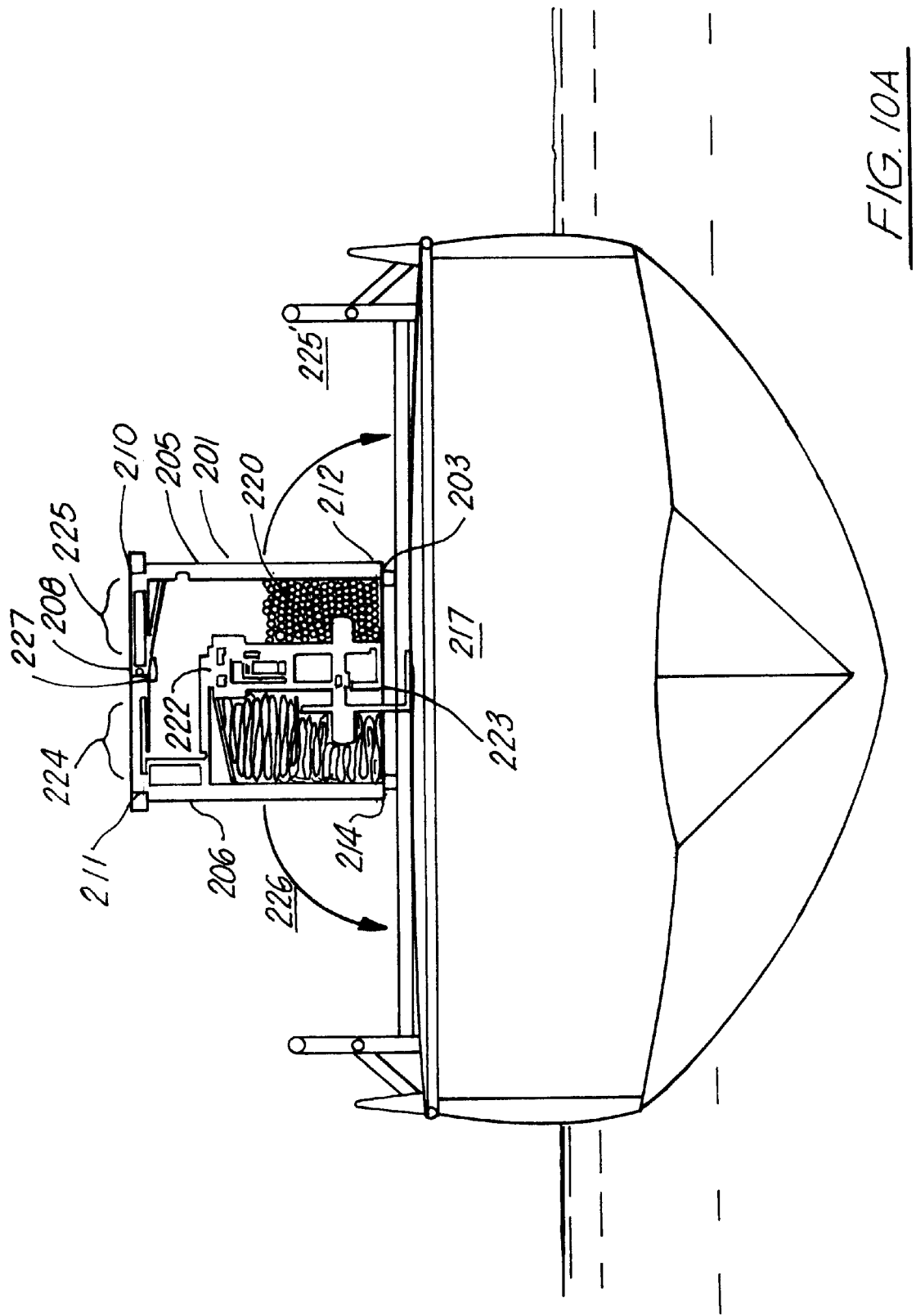
FIG. 10A provides an end view of a knockdown container located upon the main deck of a vessel adjacent to the rear end of the boat, illustrating the optional storage of cable, a canopy, and the trolley within, and the opening of the sidewalls to form a platform.
Figure 10B:
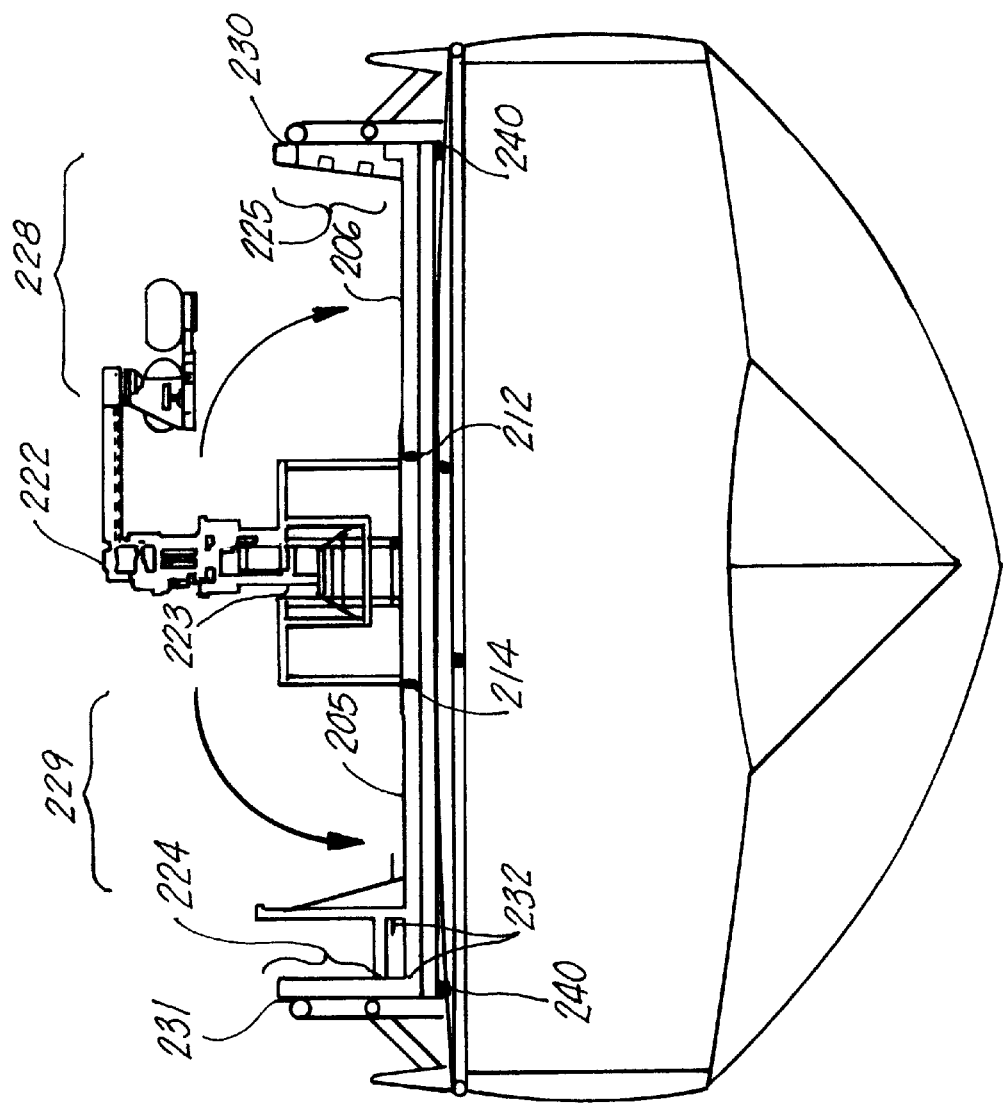
FIG. 10B provides a further end view of the knockdown container of FIG. 10A, wherein the side walls are laid upon the deck of the vessel, or, where desired, I-beams placed upon the deck of the vessel, forming first and second cable storage bins, and a center raised track for the trolley.

Referring to FIGS. 9, 10A, and 10B, the preferred embodiment of the present invention utilizes at least one modified forty foot intermodal container which has been configured to knockdown or unfold to contain a prefabricated, modular cable storage area and trolley system. The container may be shipped in a "self contained" fashion, with the cable shipped in the cable bins, as well as a cable trolley which is configured to move longitudinally along the length of the container. This main container appears on the exterior to be a typical intermodal shipping container, but is configured, once placed upon the deck of a vessel, to unfold to form a cable storage area, and include equipment for retrieval and deployment of seismic cable.

The preferred embodiment of the present system is specifically configured to handle bottom cable, which is more difficult to handle than other seismic cables. Nonetheless, the system is suitable for utilization in conjunction with all seismic cable operations.

The preferred embodiment of the present invention may be utilized in conjunction with a variety of vessels, including, for example, a 200 foot, general purpose, service vessel.

Exemplary cable which may be utilized could include, for example, 7,000 feet of bottom type, 1.4 inch diameter seismic cable, having four inch connectors.

The cable storage area 236 of the present invention is situated generally in longitudinal alignment with the longitudinal axis of the vessel, and may be comprised, in modular form, of a single container, or, as shown, multiple containers 201, 202, which are longitudinally aligned, end on end, to form a single structure. Whether one or more containers is to be used to form the cable storage area is dependent upon the length or size of cable needed (hence larger or smaller cable bin areas), the size of the ship, and related criteria.

In use, a vessel 237, such as a service boat, crew boat, or the like may be prepared to receive the extra weight of the containers upon its main deck 213 by placing a plurality of generally even spaced, aligned I-beams 215 along the deck where it is anticipated the containers will be placed, between the structure forming the wheelhouse of the vessel, and the stern 217 of the vessel. Next, a first container 201 having a first end 203 is placed, via cable 219 or the like, such that said first end 203 is situated generally adjacent to the stern of the vessel, and the second end 203' generally faces the bow of the vessel, the container also situated generally in the middle of the I-beams 215, where I-beams are utilized.

Next, a second 202 container is placed in end-to-end, longitudinal alignment with the first container, wherein its first end 204' engages or is adjacent to the second end 203' of the vessel, forming a single unitary cable storage area 236 the length of two containers, in this case, 80 feet long, having a common longitudinal axis which is aligned with the longitudinal axis 218 of the vessel 237. Again, a single container may be utilized to form the cable storage area on smaller vessels, or situations which require less or smaller seismic cable. When desired additional containers, such as a hydraulic/power room container 216, instrument room, control room, or the like in the form of containers may be modularized and mounted nearby for providing power, control, or other functions.

The cable storage area 236 itself is formed having first 203 and second 204 ends, first 205 and second 206 sidewalls, and a top wall 207 which has formed therein a longitudinal split 208 which runs generally the length of the structure, which split is latched during shipping to form a tight container, but which is unlatched to fabricate the cable storage area, as will be discussed further infra.

Like the top wall 207, the ends 203, 203', 204, 204' may be divided into two panels forming doors or the like, as is conventional, with a center split 209 forming each of the panels forming the doors at the ends of the containers, which may be removed during knockdown.

The knockdown feature of the containers 202, 203 forming the cable storage area 236 is accomplished by providing hinged lower sidewall edges 212, 214, and fixed, reinforced upper sidewall edges 210, 211, allowing the sidewall 205, 206 to be unlatched at the upper longitudinal split 208, and urged 239 towards the deck, opening the structure into a platform containing the cable storage bins, trolley, equipment, etc, as will be more fully described within.

Continuing with FIG. 10A, the container is shown with the panels forming the first end 203 removed. As shown, the container includes a dividing wall 223 having a trolley assembly 222 mounted therein, the dividing wall running generally along the center length of the floor of the container, forming first and second cable bins. As shown, cable 220 may be shipped in the cable bin, as well as a canopy 221 and other equipment; however, it is noted that cable can be very heavy, and it may be desired to ship the cable separate from the container.

The top wall of the container, as earlier indicated, is split 208, forming first 224 and second 225 divided top wall areas which may be latched together via latching mechanism 227 for shipping, or unlatched during knockdown. Again, hinged lower sidewall edges 212, 214, allow the user to unfold or open the container via pivoting 226, 225' the sidewalls apart at their upper edges, forming the knockdown structure illustrated in FIG. 10B.

Referring to FIG. 10B, the opened sidewalls of the container pivot to rest upon the deck of the vessel (or supporting I-beams, when used), forming first 228 and second 229 cable bins, divided by dividing wall 223, and having outer walls 230, 231 formed by the split top wall 225, 224 of the container, respectively, with the second 206 and first 25 sidewalls of the container forming the floor of the first and second cable storage bins 228, 229, respectively, hinged at the lower sidewall hinged edges 212, 214, respectively.

The structure may be secured to the deck of the vessel, or supporting I-beams when utilized, via intermodal securing hardware 240 on the exterior walls of the knocked down container structure. Further, as shown, the structure may further include a catwalk structure 232, built-in cable trays, a rear cable puller at the end adjacent to the stern, or other features formed therein.

Figure 11:
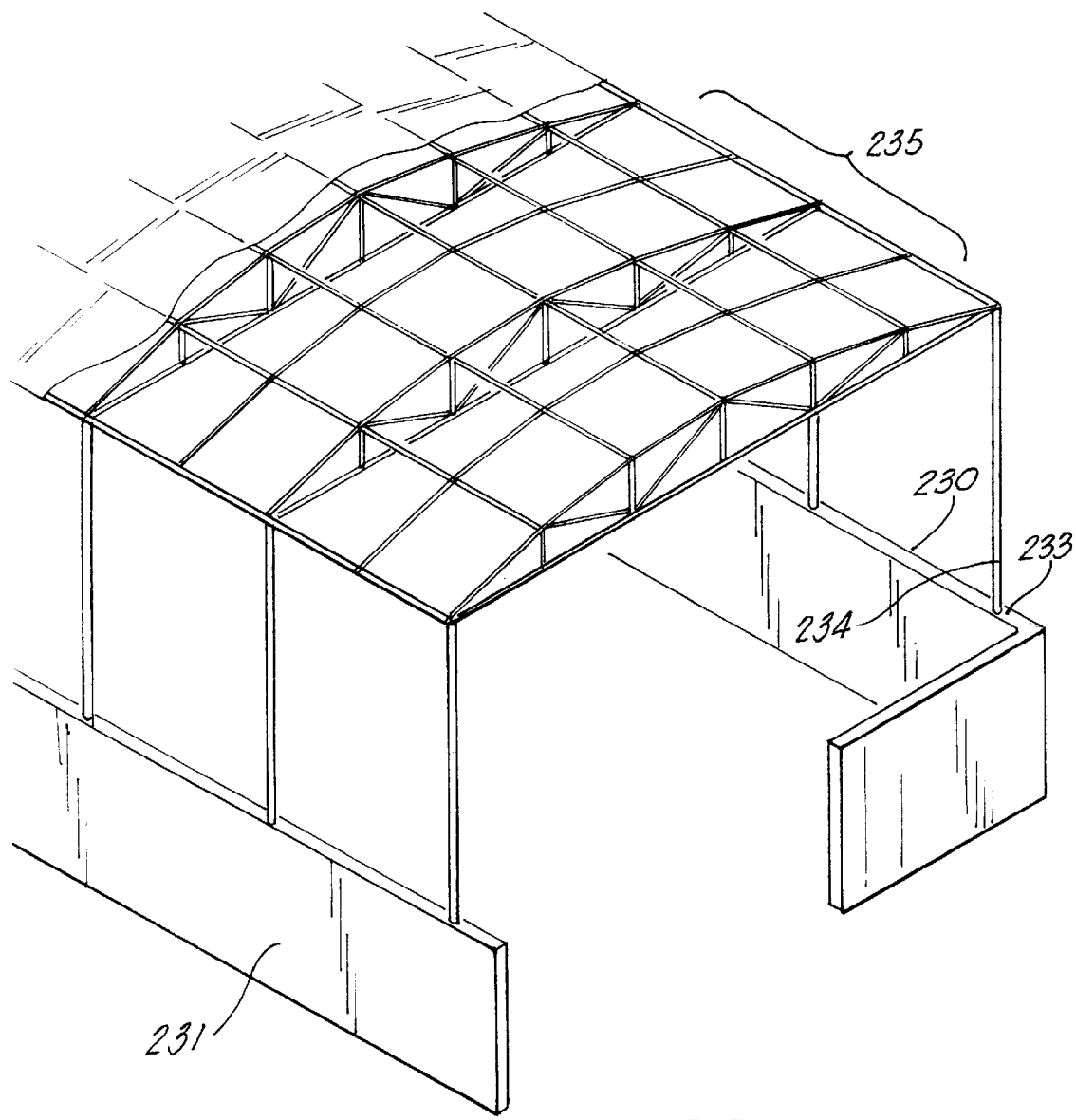
FIG. 11 provides an isometric view of the knockdown container of FIG. 10A, illustrating the installation of a canopy along the outer cable bin sidewalls formed by the collapsed container.

Lastly, referring to FIG. 11, the outer walls 230, 231 forming the cable bins may have pole conduits formed therein to allow the placement of supporting poles 234 for a canopy 235 to be situated over the cable storage area, protecting the equipment and operators from the elements.

In summary, the first phase of installation includes preparing the vessel by clearing the main deck, and, when desirable, reinforcing the main deck via laterally spaced I-beams or the like. The main container (two or more containers may be placed end-on-end when desired to form a single cable storage area) is then placed upon the deck of the vessel, atop the I-beams when implemented, then unfolded such that the end walls are removed, the split top is unlatched, and first and second side walls are hingedly manipulated at their base such that said first and second side walls rest upon the deck at opposing edges of the bottom wall of the container, opening the container upon the deck. The split top is configured to form first and second sidewalls of the cable bins when laid out, as discussed.

With the preferred embodiment of the present invention, further preparation includes the installation of a retrieval wheel situated on one side of the vessel near the front, a cable puller adjacent to the retrieval wheel, a cable tray situated along generally the length of the vessel to direct the retrieved cable from the front to the general rear of the vessel, a rear cable puller to facilitate retrieval and deployment of the cable, a power plant when necessary, as well as an instrument and/or control room, which may likewise housed in shipping containers.

Continuing with FIG. 1, the cable handling system of the preferred embodiment of the present invention is configured for the deployment and retrieval of seismic type cable, the exemplary embodiment of the present invention operating in conjunction with bottom-type seismic cable.

During seismic operations, lengths of rather heavy and cumbersome seismic cable are deployed from the stern of the vessel and, once deployed, said cable is utilized to monitor seismic activity, particularly for hydrocarbon exploration purposes. Retrieval of the cable has been a difficult and somewhat manually intensive task, and while prior systems utilized devices for pulling cable from the water, none are believed to have provided a system which did not require extensive hands-on control of the cable.

For a general overview of the present system, the exemplary embodiment of the present system retrieves cable 6, 6' from the water from the bow of the vessel, utilizing a rather large, vertically situated bow retrieval wheel 8 which freely rotates 9 as the cable is being pulled 7 via a forward wheel puller 10.

Figure 2:
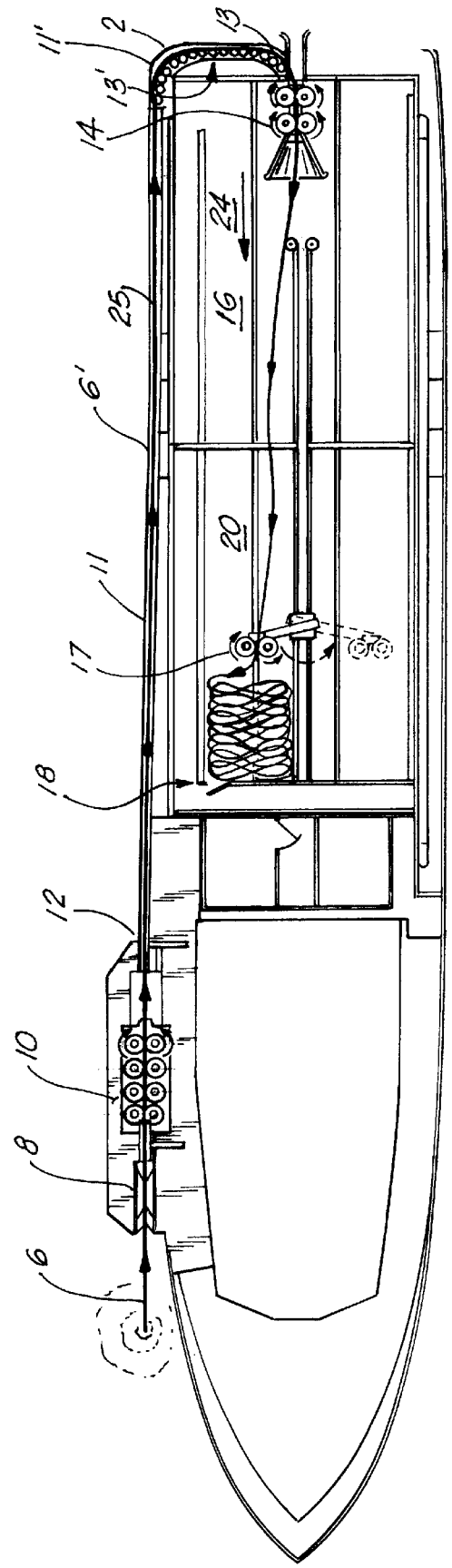
FIG. 2 provides a top, partially cut-away view of the modular seismic cable handling system of FIG. 1, illustrating the various elements of the modular seismic cable handling system and their respective locations on an exemplary vessel, as well as an exemplary cable being retrieved and stored.
Figure 2A:
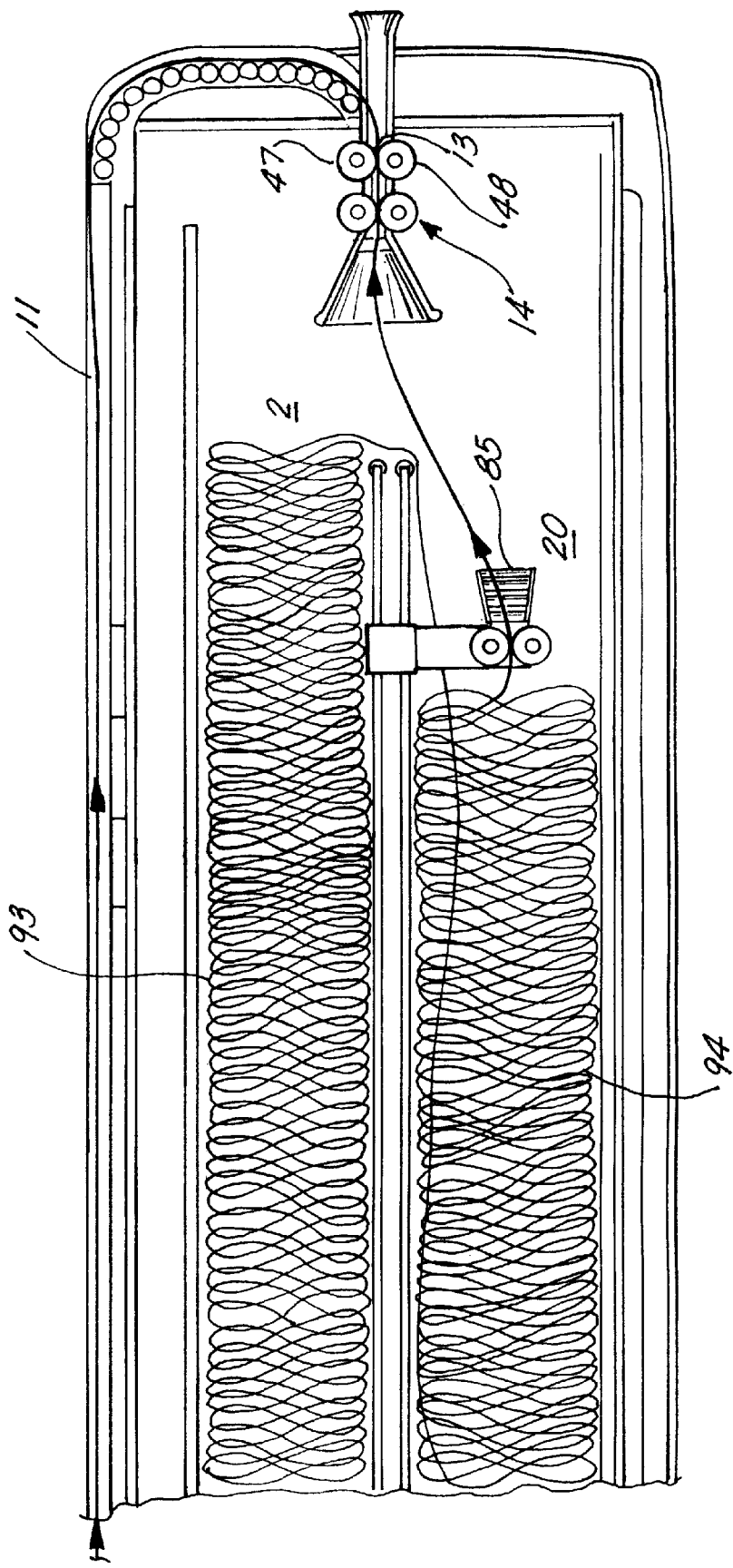
FIG. 2A provides a top, partially cut-away view of the trolley system of FIG. 2, illustrating the loading of cable into the second cable bin.

Continuing with FIGS. 2 and 2A, after passing through the bow retrieval wheel 8 and the forward wheel puller 10, the cable 6, 6' is routed to the forward end 12 of a cable tray 11, which runs generally the length of the vessel, the cable sliding 25 along generally the length of the vessel V, through the cable tray whereupon reaching the stern 2 of the vessel, the tray curves 11' to route the cable along a generally curved path to facilitate the turning the cable along 180 degree path, wherein said cable exits the rear portion 13 of the tray, whereupon said cable passes through a rear cable puller 14, urging said cable upon the main level deck 16. Generally vertically aligned rollers 13' may be utilized to form the inside wall of the curved area of the tray 11', so that the cable may contact said rollers as it is being pulled by rear cable puller 14 along its 180 degree path.

The cable then passes through a cable puller trolley 17, which pulls 24 and positions the cable, depositing it, in this figure, into the front portion 18 of first cable bin 20, as would typically occur in the early stages of a typical cable retrieval operation.

The trolley is supported by a carriage which slidingly engages a track situated atop a dividing wall situated between the first 20 and second 21 cable bins with a dividing wall 22 therebetween. The base of the trolley engaging the track is powered so as to allow the trolley to be slidingly positionable along the length of the dividing wall, allowing the trolley to be positioned along the length of the first and second cable bins, allowing the trolley to maneuvered throughout the retrieval operation along the dividing wall as the cable pile grows in the cable bin, positioning the trolley away from the cable as it piles, laying out the cable in a manner so as to avoid binding or knots.

As indicated, the cable storage area is divided into first and second bins 20, 21, respectively, via dividing wall 22; this feature has been found to be particularly advantageous in high sea operating conditions, so as to better support the cable piles and prevent shifting thereof.

Figure 3:
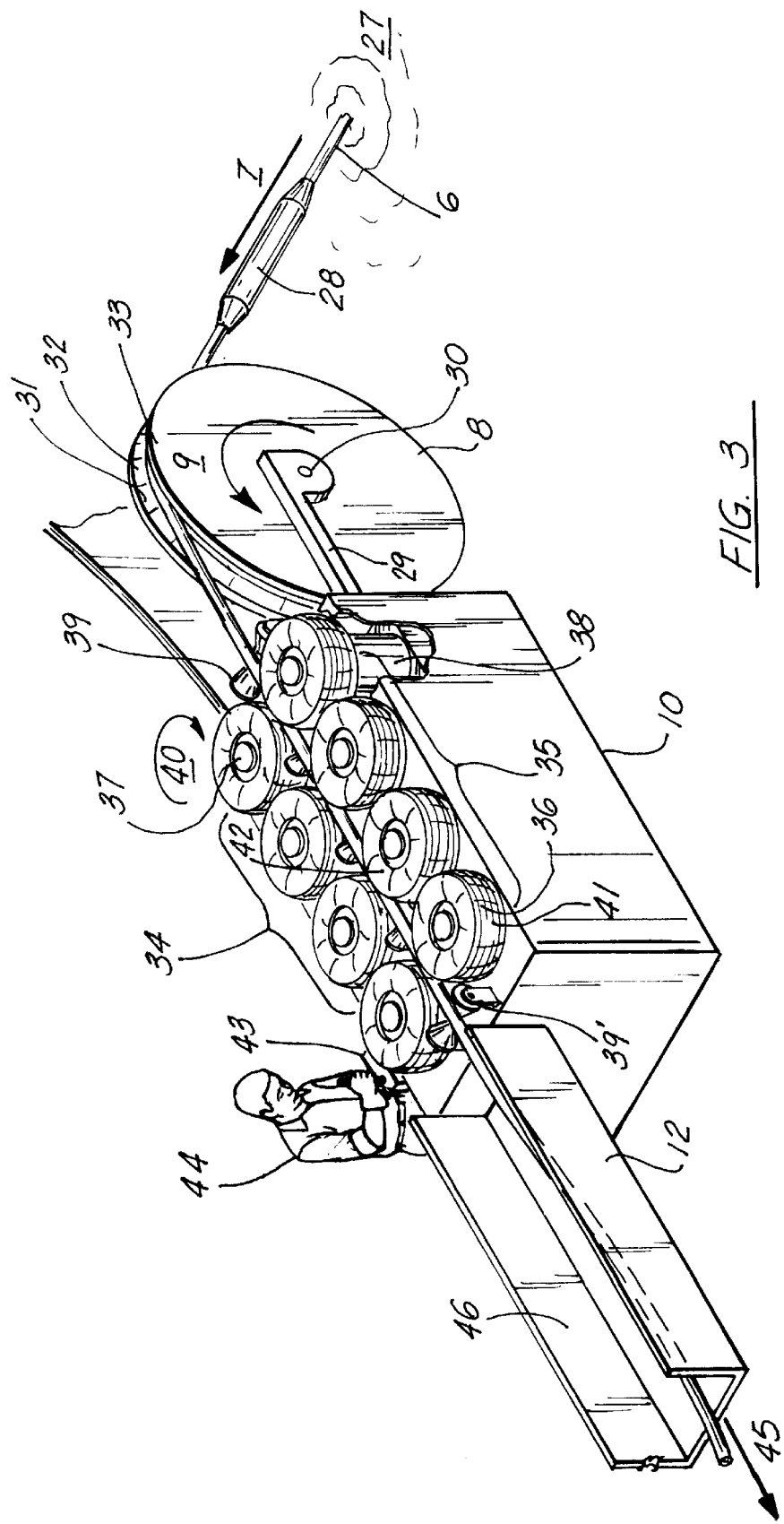
FIG. 3 provides an isometric, partially cut-away view of the modular seismic cable handling system of FIG. 1, illustrating a more detailed view of the bow retrieval wheel and eight wheel front cable puller pulling a seismic cable.

For a more detailed discussion of the retrieval system of the preferred, exemplary embodiment of the present invention, we refer to FIG. 3. During the retrieval operation, the cable end to be retrieved would typically have a retrieval buoy affixed thereto, which would be retrieved via grappling hook or the like via the crew. The cable end would then be lifted, placed over the wheel 8, and threaded through the front cable puller 10.

The bow retrieval wheel 8 of the preferred, exemplary embodiment of the present invention is about nine feet (9') in outer diameter, and is free wheeling and may utilize TEFLON bushings and bearings for low maintenance. The preferred embodiment is aluminum in construction so as to be non-corrosive. The diameter of the wheel can vary depending upon the application, and is anticipated to run anywhere, for example, from three feet (3') to twenty feet (20') in diameter.

The wheel 8 is situated in the present system in a generally vertical fashion along the starboard side of the bow of the vessel above the water, and is supported by a frame 29 which engages the axis 30 of the wheel. The wheel includes a hub 31 portion about its outer diameter, which is coated, for example, with a one inch bed 32 of high density neoprene, or vulcanized rubber, to protect and cushion the cable from possible damage.

The wheel is configured to lift and support the cable 6, including any connectors 28, along the wheel's upper portion 33, allowing the cable to ride over said wheel, said cable thereafter engaging the front wheel puller 10, which is directly behind and aligned with the wheel 8. Thusly, the wheel is positioned so as to lift, align, and steer the cable from the water, for passage through said front wheel puller 10.

Once having been lifted from the water and aligned by the wheel puller, the cable next is pulled and guided by the eight wheel cable puller, comprising first 34 and second 35, horizontally situated sets of rotatable wheels, paired so as to contact the cable and pull it along.

As shown, the present system utilizes inflated tires 36 on hubs as the wheels, each of the tires supported via a vertical axle 37, which in turn is rotated via pneumatic or electric motor 38 or the like. The preferred, exemplary embodiment of the present invention utilizes eight respective motors, one for each wheel, utilizing a Charlyn model #104, 2000 series hydraulic motor with 11.9 cubic inches displacement. The unit is powered by a 50 horsepower electric motor operating at 25 GPM.

Rollers 39, 39' may be provided to position the cable so as to contact the outer diameters of the tires, between the respective pairs.

As further illustrated, the pairs of tires are configured so as to be spaced 42 such that the cable runs between the respective pairs of tires (along the outer diameter 41 of the tires) with sufficient force so as allow said rotating tires to frictionally pull said cable, upon the powered rotation of said tires. The spacing and rotational speed of the respective pulling pairs of tires may be varied, as necessary, via control box 43, which may be operated by personnel 44, or may be automatic, with the utilization of appropriately placed sensors and switches.

During cable retrieval operations, the shipside tires would rotate in a clockwise 40 fashion, as the opposing tires would rotate in a counterclockwise fashion, thereby frictionally urging said cable along 45 in a forward manner, into the front portion 12 of the cable tray (11 in FIG. 1). Further, the directions would be reversible as necessary, for drawing the cable backward. In addition, sensors may be provided to monitor the pulling force of the cable, especially in rough seas, and the cable puller controls may be configured so as to slow, stop, or reverse when the sensor indicates excessive pulling force on the cable.

Likewise, the vessel speed control may be linked to the speed of the cable puller, so as to facilitate the quickest, least stress means of retrieving the cable.

The tires are oversized and to some degree, underinflated, to allow for the "soft" gripping of the cable, providing sufficient gripping for pulling said cable, while allowing said tires to give in with the passage of a larger diameter connector 28 therethrough, so as not to have to vary the mechanical space between the tires during the retrieval of the cable.

The preferred, exemplary embodiment of the front eight wheel cable puller is designed to run at a top operating speed of 97 RPM each wheel with the present components. Each pair of wheels is capable of providing 315 pounds of line pull, providing a total of 1260 pounds of line pull alone, without assistance from other cable pullers in the system. More details on the operation of the cable puller will be discussed infra.

Referring to FIGS. 1, 2, and 3, the tray 11 runs generally the length of the starboard side of the vessel, along the upper level deck, and may be lined 46 with ultra high molecular weight (UHMW) TEFLON sheet material, so that the cable will slide easily to the rear of the vessel. In the present, exemplary embodiment, the trays are about one hundred feet (100') long.

Referring to FIG. 2A, located at the rear end 13 of the tray 11 is the rear cable puller, which the preferred embodiment of the present invention contemplates as being a two wheel puller, but may also include a four wheel puller, as shown, which may be advantageous on longer ships, for example. The puller is arranged of first 47 and second 48 sets of puller wheels arranged in horizontal fashion, and operates along the same methodology and arrangement as the front eight wheel cable puller, supra.

The rear cable puller 14 pulls the cable down through the trays, and further drives the cable to the cable storage area, as will be further discussed below. This unit has the same type hydraulic motors as the front cable puller, and may be powered, if desired, by the same power pack driving the front unit so that both units run in series and at the same speed, thereby providing uniform control of the cable passing therebetween.

Figure 4:
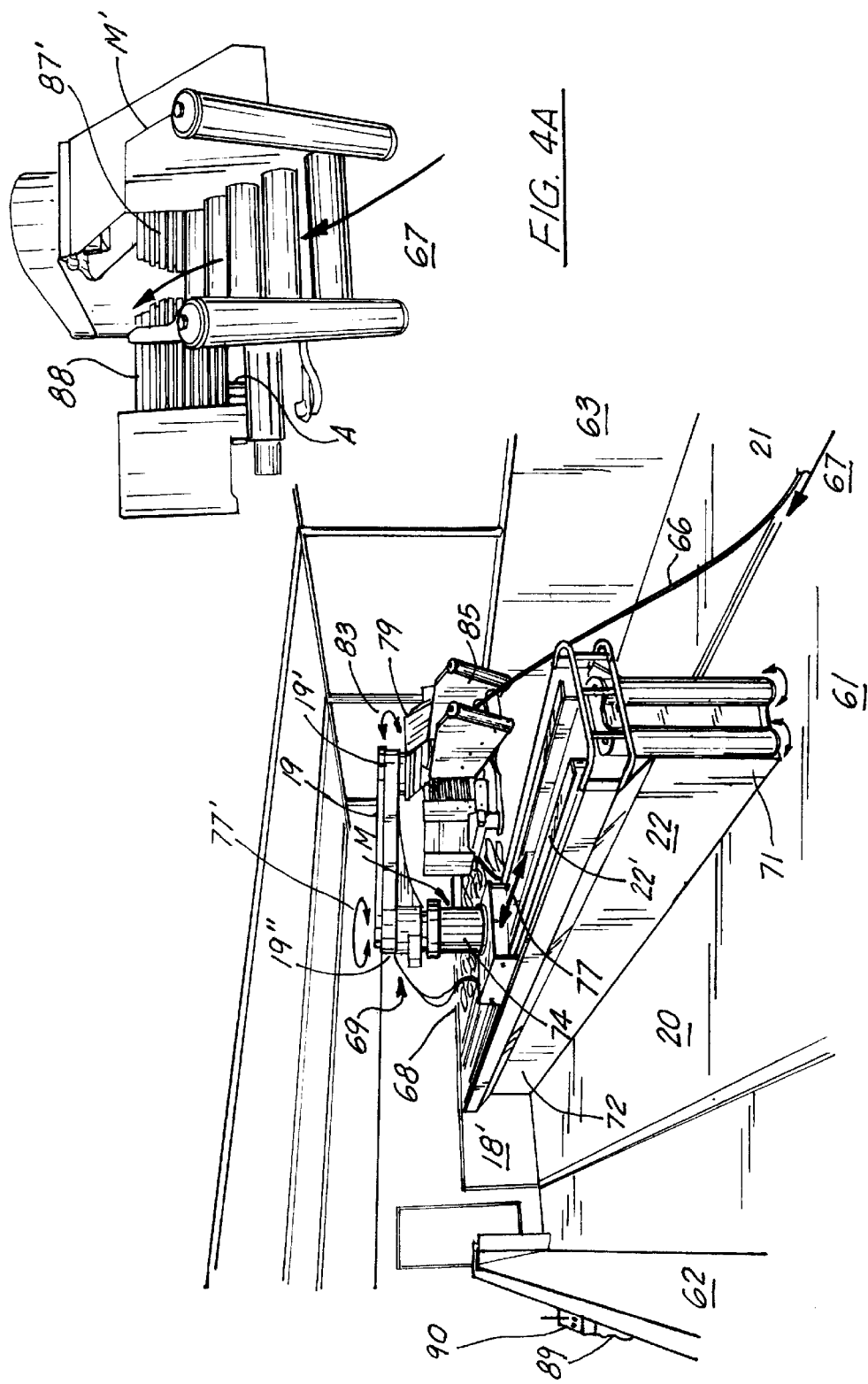
FIG. 4 provides an isometric view of the modular seismic cable handling system of FIG. 1, illustrating the operation of the cable trolley system deploying cable into the cable storage bin.

Referring to FIG. 4, the platform 61 comprises a bed formed by at least one knock-down, intermodal type cargo container (as will be more fully discussed infra), and includes a cable storage area, situated generally between the back of the main cabin to the rear, or stern, of the boat, and comprising in the exemplary embodiment first 20 and second 21 cable storage bins, formed by a dividing wall 22 and contained by side walls 63, 62, respectively, and an end wall 18', situated towards the front portion of the main deck. The cable retaining walls in the exemplary embodiment are about, for example, four feet (4') high, and fabricated with ³⁄₁₆" plate.

Slidingly engaged to the upper end of the dividing wall 22 is trolley assembly 69, which is supports a floating cable puller 79 for motivating or pulling 67 cable 66, urging same into a pile 68 in the storage bin. Continuing with FIGS. 4 and 4A, the cable puller 79 includes a front opening 85 (for ingress or egress of the cable, depending upon the desired pulling direction) which receives the cable, which cable is pulled via first 87 and second 88 sets of horizontally situated puller wheels, each supported via vertical axle A and driven via hydraulic, electric or other type motor M', after which the cable is routed through a rear passage. The floating cable puller may be a two or four wheel puller, as preferred and desirable, and it is constructed and operates in the same fashion as set forth with the cable pullers discussed supra.

The floating cable puller 79 is supported by a generally horizontally situated pivot arm 19, which includes first 19' and second 19" ends, the first end pivotally engaging and supporting the floating cable puller, the second end pivotally engaging and supported by the trolley base 74, which base in turn slidingly engages tracks 22 which are provided along the top end of the dividing wall 22. The dividing wall 22, has first 71 and second 72 ends, and the length of which, in the preferred embodiment of the present invention, is generally longitudinally aligned with the longitudinal axis of the container bed and the vessel upon which it is installed.

The trolley assembly is configured to pivot 77 the second end 19" of pivot arm 19, in order to position the floating cable puller 79 above the first or second cable bins for loading or unloading cable, or above the dividing wall, to provide a stable, out of the way storage position, via hydraulic or electric motor M within the trolley base 74. Further, said motor within the trolley base may be utilized to power rollers situated in the base in such a manner as to frictionally engage tracks 22', thereby providing linear movement 77 along the length of the upper portion of dividing wall 22.

Alternatively, a motor may be mounted within said dividing wall to motivate the trolley base along the length of the dividing wall via the utilization of, for example, a cable or belt system.

Figure 5:
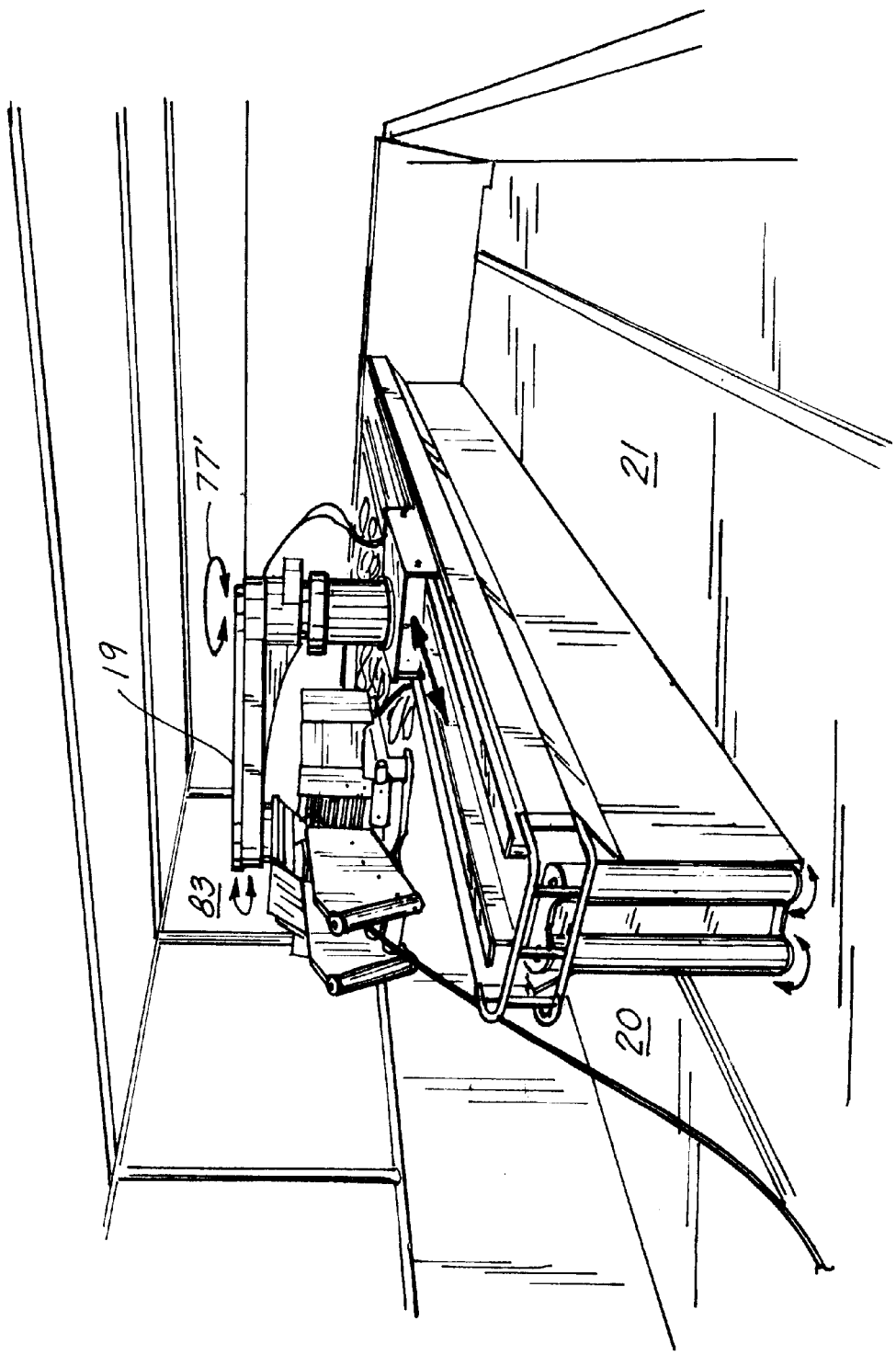
FIG. 5 provides an isometric view of the trolley of FIG. 1, illustrating the unit positioned over the second cable bin, and the relative movement of the system in use.

Referring to FIGS. 4 and FIG. 5, further, the floating cable puller 79 is configured to pivot 83 at the first end 19' along a vertical axle upon demand via motor M', in order to maintain the position of the front opening 85 of the floating cable puller 79 astern. Via pivoting pivot arm 19 at the FIG. 4 illustrates the floating cable puller positioned over the second cable bin 21, while FIG. 5 illustrates the floating cable puller 79 thereby pivotally 77' situated over the first cable bin 20.

The movement of the trolley assembly may be controlled via control chassis 90, which controls the respective motors or other motivating means for trolley positioning discussed supra. Infrared, RF, or wire 89 may be utilized to communicate the commands from the control box to the trolley assembly. An individual or an automated system, such as a computer, may control the position of the system.

In addition, the control chassis or automated system also may control the floating cable puller, including the selective operation, such as on-off, speed, and direction, and spacing of the wheels, as necessary and desirable.

Generally, in forming the pile 68 of cable in the cable bin, the trolley only need be positioned in spaced relation from the pile, astern from the pile but aligned with about the center of the bin, and not too fast cable puller speed, and the cable will generally pile itself in a uniform manner.

Referring to FIG. 2A, after the cable is piled 93 to fill one cable bin 21 (in cases where split bins are utilized), the floating wheel puller is then motivated to the front of the other bin 20, forming a new pile 94. If the cable begins to knot or bind during piling, or if the type of cable is difficult to motivate, the trolley 96 may be motivated to pivot via pivot arm 19, at a speed consistent with the speed of the cable puller, to in effect spool the cable onto the pile in an unbinding fashion. This process may be automated into various programmed routines, depending upon the type and size of cable bin, cable type, and operating conditions. In this operation, with the pivoting of the pivot arm, the floating wheel puller should likewise be pivoted relative to the pivoting trolley arm to maintain the front opening 85 facing generally astern.

Figure 6:
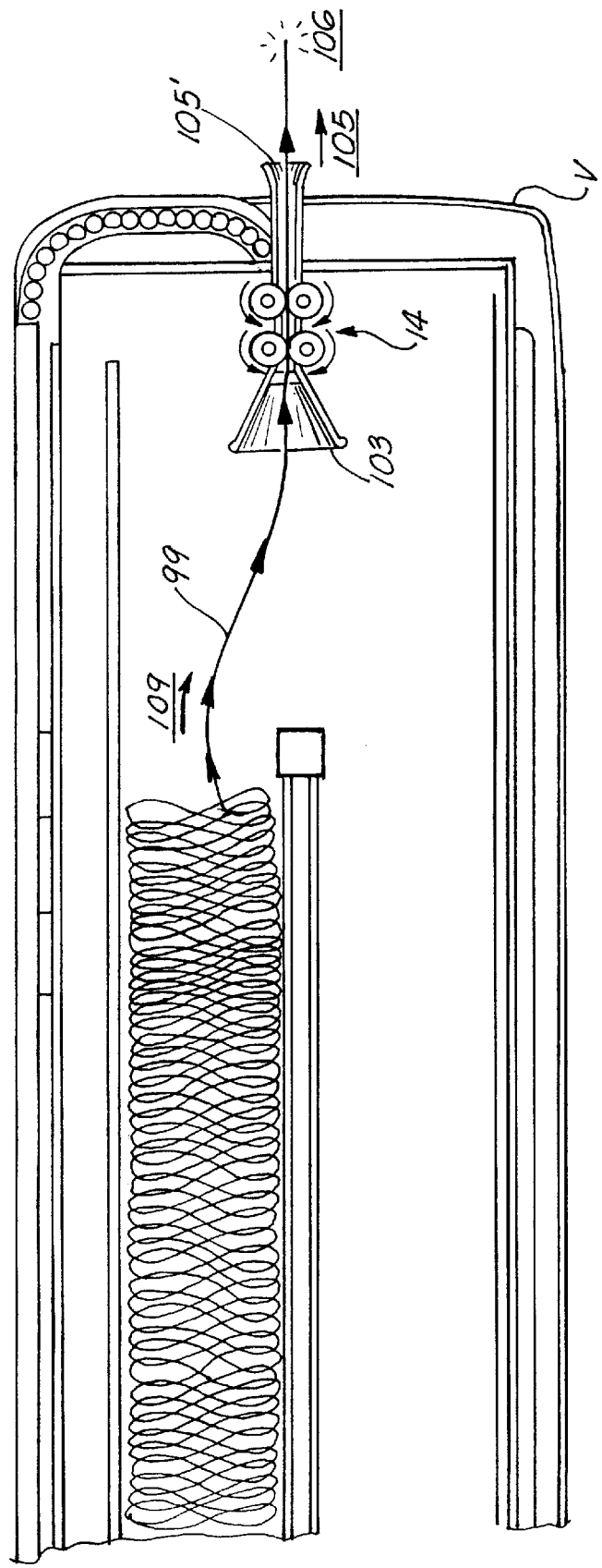
FIG. 6 provides a top, partially cut-away view of a method of deployment of the cable from a cable bin, utilizing the rear cable puller, with the trolley parked in a center parking/storage position.

Continuing with FIG. 6, to deploy the cable to sea from the storage bin, the first end of the cable is threaded through the rear cable puller 14, and the puller then initiated in a reverse direction from the loading direction set forth in the discussion of FIGS. 2 and 2A, so as to pull 109 the cable 99 out 105 of the vessel, through an egress passage 105' and into the water 106. The vessel V may be powered in a forward direction 98 to evenly spool out the cable. A ramp 103 may be provided to urge the cable up into the wheel puller area of the cable puller 79. During cable deployment operations, the rear cable puller may include a speed control which may be linked to the speed of the vessel, for optimal deployment of the cable.

It is noted that the trolley assembly may also be utilized, when desired, to assist the rear cable puller in deploying the cable astern, in which case, an end of a cable in the bin would be threaded through the rear passage of the floating trolley assembly, and out the front opening of the assembly, to the rear cable puller, and off the stern of the vessel into the water.

For utilizing the trolley assembly/floating cable puller to stow the cable, an exemplary methodology is set forth below; it is noted that the ingress/egress ports of the floating cable puller are effectively reversed when the direction of rotation of the wheels is reversed. In use, the operator:

a. utilizes said control means for selectively positioning said floating cable puller to the general vicinity of the cable storage area, with the trolley assembly front opening facing astern, and the rear passage facing generally towards said cable storage area;

b. threads a cable through the front opening, or cable ingress port, of said floating cable puller;

d. initiates said floating cable puller, allowing said floating cable puller to pull said cable, urging said cable out of said rear passage of said floating trolley assembly, and into said cable storage area;

e. allowing said cable puller to pile said cable in said storage area;

f. manipulates the position of said floating cable puller via said control means, selectively depositing cable in said cable storage area in a uniform pile;

g. repeating steps e–f until the full length of cable has been placed into said cable storage area.

In deploying the cable from the storage area to the water, the operator follows the steps of:

a. threading an end of said cable in said cable storage bin through said rear cable puller;

b. initiating said rear cable puller, allowing said rear cable puller to pull said cable, urging said cable from said cable storage area to astern said vessel;

c. urging said cable through said egress passage, and into said body of water d. repeating steps b–c until the full length of said cable has been deposited in said body of water.

Figure 8:
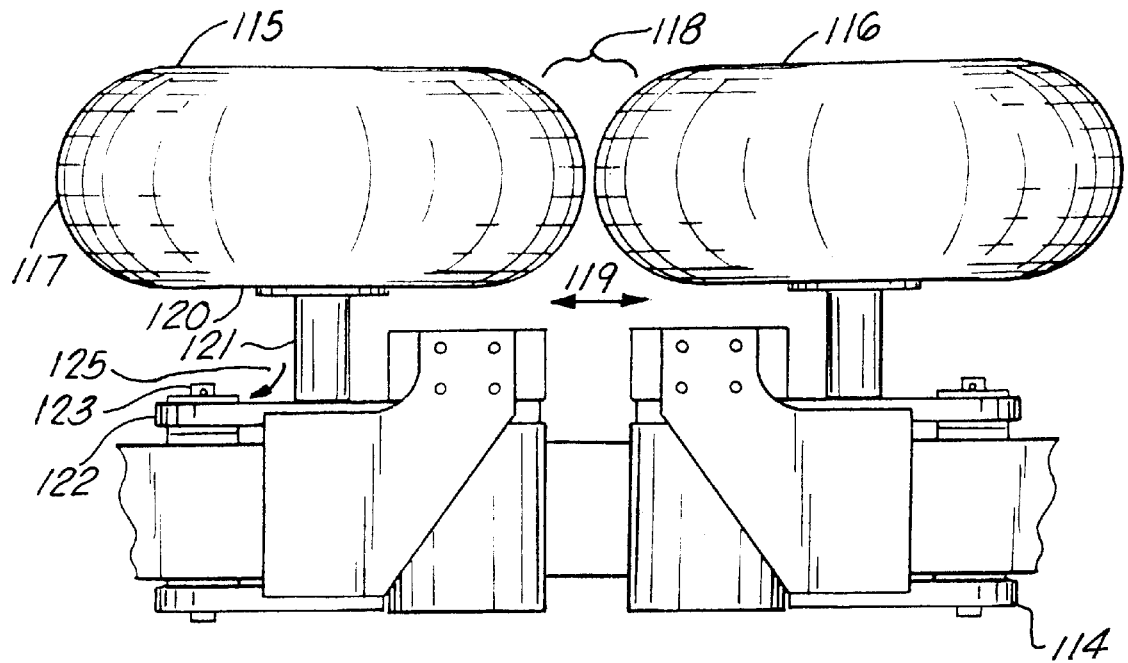
FIG. 8 provides an end view of the modular seismic cable handling system of FIG. 1, illustrating the position of two tires in a cable puller arrangement as utilized in the present invention.

Referring now to FIG. 8, the front and rear cable pullers, as well as the floating cable puller, all utilize a common cable pulling system, which provides a superior means of pulling seismic cable, and the relatively large diameter connectors associated therewith.

As shown, the cable puller 114 includes first 115 and second 116 sets of horizontally situated tires on hubs 120, the tires positioned to form a gripping space 118 therebetween, each of the tires further having an outer diameter gripping face 117. While varying the space between the tires 118 is not particularly necessary with the present system, as will be more fully explained below, it may be advantageous to vary said spacing, and accordingly, the preferred, exemplary embodiment of the invention includes such a means to vary 119 the spacing between the tires.

As further shown, each of the hubs is supported by a vertical shaft 121 which rests upon support member 122, which in turn is pivotally connected 123 to the support chassis; pivoting 125 of this support member 122 results in movement of the supported wheel member, resulting in a varying 119 of the spacing between the wheels 115, 116.

Figure 8A:
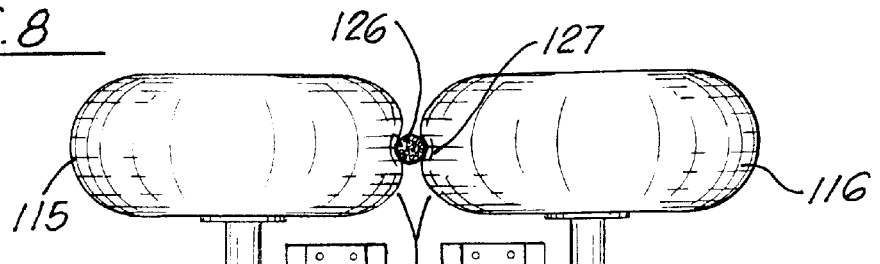
FIG. 8A provides an end view of the modular seismic cable handling system of FIG. 1, illustrating the position of two tires in a cable puller arrangement as utilized in FIG. 7, with an exemplary seismic cable situated therebetween, as it would be pulled by the rotation of said tires, as well as the relative deflection of said tires associated therewith.

Referring now to FIG. 8A, the tires on the cable pullers utilized in the present invention are configured to be relatively oversized when compared to other, prior art tires, and further said tires are filled to an air pressure less than what one would likely normally utilize in most applications involving said tires. For example, the exemplary embodiment of the present invention utilizes, for example, twenty-two inch size CARLISLE brand tires, filled to 6 psi. The current tires being utilized have a knobby tread, which has been found to work well. These types of tires are believed to be utilized in lawn tractors and the like, and are believed to have a recommended pressure rating of 12–14 PSI for such applications, so the present system is utilizing tires at a pressure which would likely be considered under inflated by conventional standards.

With the present tire arrangement, it has been found that the cable puller tires 115, 116 provide a better, yet less damaging friction grip on the cable 126, the tires deflecting 127 to accommodate the cable during their rotational/pulling operations, without the need for space adjustments 118.

Figure 8B:
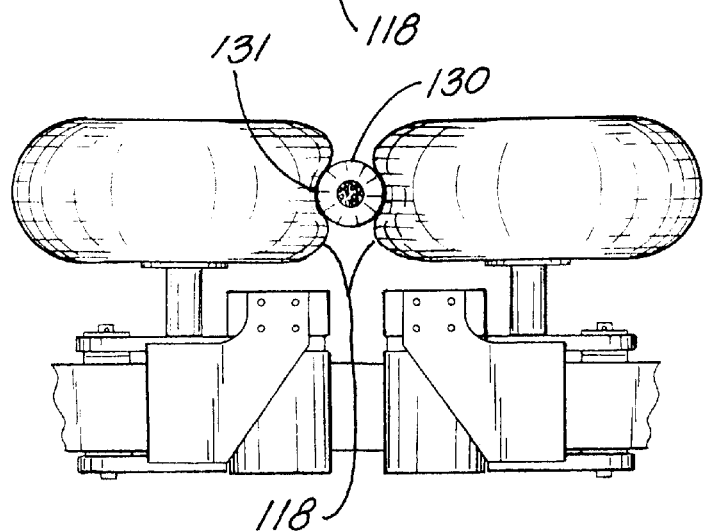
FIG. 8B provides an end view of the modular seismic cable handling system of FIG. 1, illustrating the position of two tires in a cable puller arrangement as utilized in FIG. 7, with an exemplary seismic cable connector situated therebetween, as it would be pulled by the rotation of said tires, as well as the relative deflection of said tires associated therewith.

Further, as shown in FIG. 8B, when the cable connector 130 (28 in FIG. 3) passes between the tires, said tires merely deflect 131 more, providing a relatively soft, yet firm grip to the connector in a non-damaging, but effective pulling operation. Again, the spacing 118 between the tires need not be mechanically adjusted; the tire merely deflects, and the connector is pulled therethrough.

Figure 7:
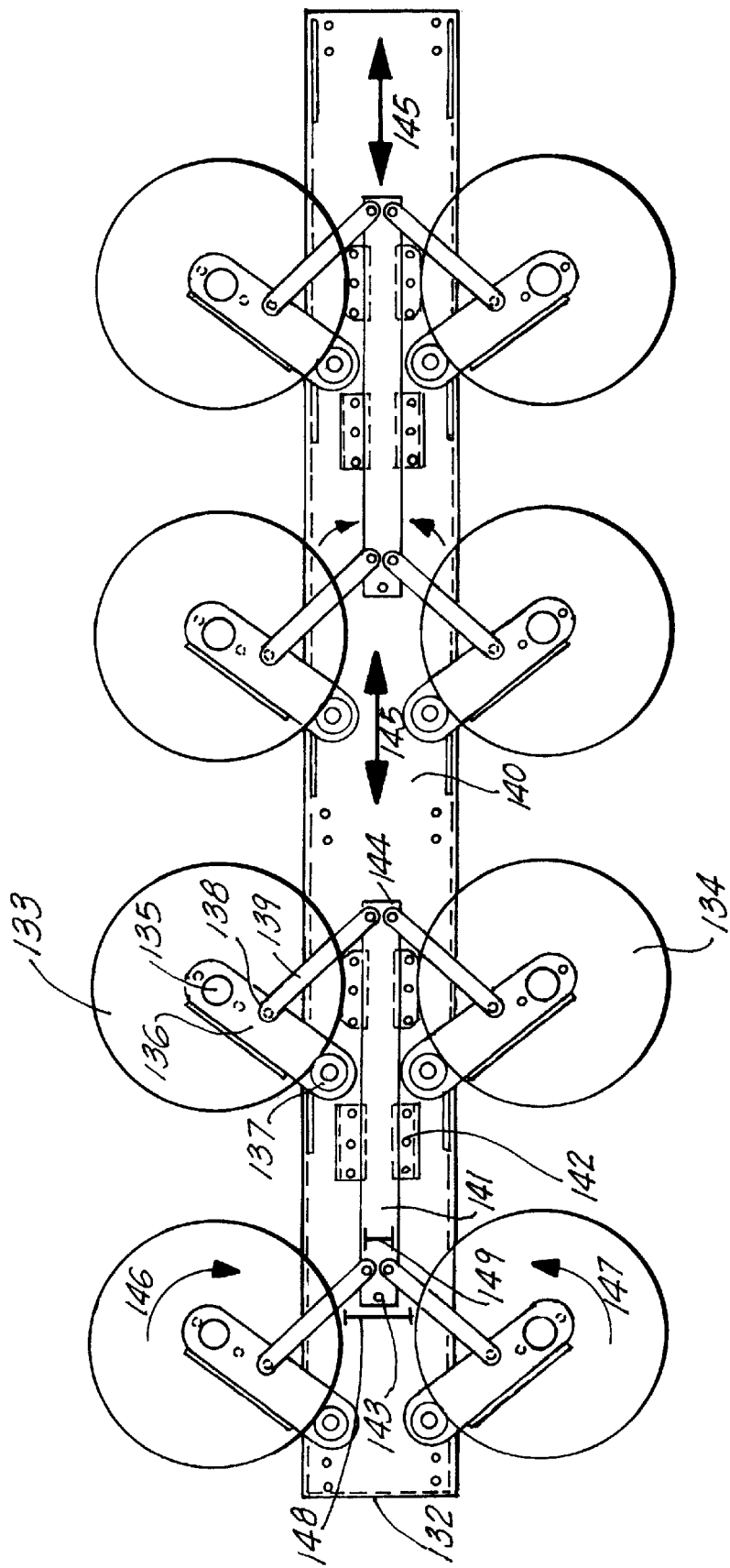
FIG. 7 provides a cut-away view of the mechanics of an exemplary cable deployment retrieval system, detailing an exemplary means to vary the space between the cable puller wheels.

FIG. 7 illustrates an exemplary mechanical means of spacing the opposing pairs of tires in the cable puller arrangement as used in the present system, including the front and rear cable pullers on the upper level deck, as well as the floating cable puller on the main deck.

As shown, the base member 140 of the spacer member 132 supports first 133 and second 134 sets of opposing tires, each supported by a vertical shaft 135. A tire support member (under the tire shown) engages the shaft 135 at one end, and is pivotally connected 137 to the support member at the other end.

As further shown, the first end of a pivot member 139 is pivotally connected 138 to the medial area of the tire support member 136, the other end the other end connected to slider member 141, which has first 143 and second 144 ends.

The slider member is slidingly connected 142 to the base member 140, such that longitudinal movement 145 of the slider member, which may be powered via motor, cylinder, or servo, causes the respective pairs of gripping wheels to pivot closer together 146, 147 or spread further apart, from an open tire position 148 to a cable gripping position 149 depending upon the direction the slider bar is urged.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A cable handling system for retrieving or deploying cable to or from a body of water via a marine vessel having a longitudinal axis, a bow and stern, and a deck having a cable storage area, comprising:

a floating cable puller for pulling cable, said floating cable puller supported over said deck, said floating cable puller further comprising a trolley assembly for positioning said floating cable puller in various locations above or upon said deck, said trolley assembly further comprising:

motivation means for motivating said trolley assembly about said deck;

control means for selectively controlling said motivation means and said floating cable puller.

2. The cable handling system of claim 1, wherein the cable storage area is divided by a dividing wall having a length, and wherein said trolley assembly further comprises a trolley base, said trolley base configured to slidingly engage said dividing wall in such a manner as to allow said trolley base to be positioned along the length of said dividing wall.

3. The cable handling system of claim 2, wherein said motivation means comprises a motor mounted in said trolley base, said motor configured to engage said dividing wall in such a manner as to motivate said trolley base to selectively move along the length of said dividing wall.

4. The cable handling system of claim 2, wherein said motivation means is associated with said dividing wall, said motivation means configured to engage said trolley base in such a manner as to motivate said trolley base to selectively move along the length of said dividing wall.

5. The cable handling system of claim 2, wherein said floating cable puller is supported by a generally horizontally situated pivot arm having first and second ends, said first end pivotally engaging and supporting the floating cable puller, said second end pivotally engaging and supported by said trolley base.

6. The cable handling system of claim 5, wherein there is further included pivot means for selectively pivoting said first and second ends of said horizontally situated pivot arm, to selectively position said floating cable puller in a general circular periphery about said trolley base.

7. The cable handling system of claim 1, wherein said floating cable puller comprises first and second, horizontally situated, powered, rotatable wheels, paired so as to form a linear cable passage therethrough for pulling said cable.

8. The cable handling system of claim 1, wherein said wheels comprise tires which are under inflated, so as to allow for a soft gripping of said cable, providing sufficient gripping for pulling said cable under normal operating conditions, while allowing said tires to give in with the passage of a larger diameter connector therethrough, without the necessity of mechanically varying the spacing between the tires.

9. The method of manipulating cable on a deck on a vessel having a longitudinal axis, said vessel situated on a body of water, said deck having a cable storage area and a stern, comprising the steps of:

a. providing a cable handling system, comprising:
    a floating cable puller for pulling cable, said floating cable puller suspended over said deck, said floating cable puller further comprising a trolley assembly for positioning said floating cable puller in various locations above or upon said deck, said floating cable puller having a cable passage therethrough, forming cable ingress and egress ports, said trolley assembly further comprising:
    motivation means for motivating said trolley assembly about said deck;
    control means for selectively controlling said motivation means and said floating cable puller;

b. utilizing said control means for selectively positioning said floating cable puller to the general vicinity of said cable storage area, with said cable egress port pointed generally towards said cable storage area;

c. threading a cable through said cable ingress port of said floating cable puller;

d. initiating said floating cable puller, allowing said floating cable puller to pull said cable, urging said cable through said egress port into said cable storage area;

e. piling said cable in said storage area;

f. manipulating the position of said floating cable puller via said control means, selectively depositing cable in said cable storage area in a uniform pile;

g. repeating steps e–f until the full length of cable has been placed into said cable storage area.

10. A cable handling system for retrieving or deploying cable to or from a body of water via a marine vessel having a longitudinal axis, a bow and stern, and a deck, comprising:

a cable storage area provided upon said deck of said vessel, said cable storage area having first and second ends, said first end of said cable storage area situated in the vicinity of said stern of said vessel, said cable storage area further comprising first and second sidewalls, and a dividing wall situated therebetween, said dividing wall having a length, said dividing wall generally aligned with the longitudinal axis of said vessel;

a floating cable puller for pulling cable, said floating cable puller supported over said deck, said floating cable puller further comprising a trolley assembly for positioning said floating cable puller in various locations above or upon said deck, said trolley assembly further comprising a trolley base, said trolley base slidingly engaged to said dividing wall in such a manner as to allow said trolley base to be supported by said dividing wall and be positioned along the length of said dividing wall, said trolley assembly further comprising:

motivation means for motivating said trolley assembly along the length of said dividing wall;

control means for selectively controlling said motivation means and said floating cable puller.

11. The cable handling system of claim 10, wherein said motivation means comprises a motor mounted in said trolley base, said motor configured to engage said dividing wall in such a manner as to motivate said trolley base to selectively move along the length of said dividing wall.

12. The cable handling system of claim 10, wherein said motivation means is associated with said dividing wall, said motivation means configured to engage said trolley base in such a manner as to motivate said trolley base to selectively move along the length of said dividing wall.

13. The cable handling system of claim 10, wherein said floating cable puller is supported by a generally horizontally situated pivot arm having first and second ends, said first end pivotally engaging and supporting the floating cable puller, said second end pivotally engaging and supported by said trolley base.

14. The cable handling system of claim 13, wherein there is further included pivot means for selectively pivoting said first and second ends of said horizontally situated pivot arm, to selectively position said floating cable puller in a general circular periphery about said trolley base.

15. The cable handling system of claim 10, wherein said floating cable puller comprises first and second, horizontally situated, powered, rotatable wheels, paired so as to form a linear cable passage therethrough for pulling said cable.

16. The cable handling system of claim 10, wherein said wheels comprise tires which are under inflated, so as to allow for a soft gripping of said cable, providing sufficient gripping for pulling said cable under normal operating conditions, while allowing said tires to give in with the passage of a larger diameter connector therethrough, without the necessity of mechanically varying the spacing between the tires.

17. An intermodal shipping container which is convertible to a platform work surface, the container comprising first and second ends, a bottom wall, and first and second sidewalls, each of said sidewalls having an upper edge and a lower edge, said lower edges of said sidewalls communicating with said bottom wall, said intermodal shipping container further comprising:

first and second top wall members communicating with said upper edges of said first and second sidewalls, respectively, said top wall members configured to selectively removably engage one another to form a unitary top wall, and be selectively disengaged, as desired;

hinge means associated with said lower edges of said sidewalls, allowing said sidewalls to be hingedly manipulated by selectively disengaging said first and second top wall members, so as to pivot said first and second sidewalls to rest in general planar relationship with said bottom wall, forming a work platform having first and second sidewalls formed by said first and second top wall members, respectively.

18. An intermodal shipping container which is convertible to a platform work surface, the container comprising first and second ends, a bottom wall, and first and second sidewalls, each of said sidewalls having an upper edge and a lower edge, said lower edges of said sidewalls communicating with said bottom wall, said intermodal shipping container further comprising:

first and second top wall members communicating with said upper edges of said first and second sidewalls, respectively, said top wall members configured to selectively removeably engage one another to form a unitary top wall, and be selectively disengaged, as desired;

hinge means associated with said lower edges of said sidewalls, allowing said sidewalls to be hingedly manipulated by selectively disengaging said first and second top wall members, so as to pivot said first and second sidewalls to rest in general planar relationship with said bottom wall, forming a work platform having first and second sidewalls formed by said first and second top wall members, respectively.

19. An intermodal shipping container which is convertible to a platform work surface forming a modular seismic cable handling system, the container comprising first and second ends, a bottom wall, and first and second sidewalls, each of said sidewalls having an upper edge and a lower edge, said lower edge of said sidewalls communicating with said bottom wall forming a floor surface, said intermodal shipping container further comprising:

first and second top wall members communicating with said upper edges of said first and second sidewalls, respectively, said top wall members configured to selectively removably engage one another to form a unitary top wall, and be selectively disengaged, as desired;

hinge means associated with said lower edge of said sidewalls, allowing said sidewalls to be hingedly manipulated by selectively disengaging said first and second top wall members, so as to pivot said first and second sidewalls to rest in general planar relationship with said bottom wall, forming a work platform having first and second sidewalls formed by said first and second top wall members, respectively;

a dividing wall emanating from said floor surface of said bottom wall, said dividing wall having a length;

a trolley assembly slidingly engaged to said dividing wall, so as to allow said trolley assembly to be slidingly motivated along the length of said dividing wall, said trolley assembly supporting a floating cable puller.

20. The method of converting a vessel to provide seismic cable handling capabilities, the vessel having a longitudinal axis, a bow, stern and a deck, comprising the steps of:

a) providing an intermodal shipping container which is convertible to a platform work surface forming a modular seismic cable handling system, the container comprising first and second ends, a bottom wall, and first and second sidewalls, each of said sidewalls having an upper edge and a lower edge, said lower edges of said sidewalls communicating with said bottom wall forming a floor surface, said intermodal shipping container further comprising:

first and second top wall members communicating with said upper edges of said first and second sidewalls, respectively, said top wall members configured to selectively removably engage one another to form a unitary top wall, and be selectively disengaged, as desired;

hinge means associated with said lower edges of said sidewalls, allowing said sidewalls to be hingedly manipulated by selectively disengaging said first and second top wall members, so as to pivot said first and second sidewalls to rest in general planar relationship with said bottom wall, forming a work platform having first and second sidewalls formed by said first and second top wall members, respectively;

a dividing wall emanating from said floor surface of said bottom wall, said dividing wall having a length;

a trolley assembly slidingly engaged to said dividing wall, so as to allow said trolley assembly to be slidingly motivated along the length of said dividing wall, said trolley assembly supporting a floating cable puller;

b) transporting said intermodal shipping container to the vicinity of said vessel;

c) loading said intermodal shipping container upon the deck of said vessel;

d) positioning said intermodal shipping container upon the deck of said vessel such that said dividing wall of said intermodal shipping container is generally aligned with said longitudinal axis of said vessel, and said first end of said intermodal shipping container is situated generally adjacent to the stern of the vessel;

e) hingedly manipulating said sidewalls of said intermodal shipping container by selectively disengaging said first and second top wall members, so as to pivot said first and second sidewalls to rest in general planar relationship with said bottom wall upon said deck of said vessel, forming a work platform having first and second sidewalls formed by said first and second top wall members, forming first and second cable bins divided by said dividing wall;

f) positioning said trolley assembly along said dividing wall;

g) utilizing said floating cable puller to pull seismic cable into said first cable bin; and h) utilizing said floating cable puller to pull seismic cable into said second cable bin.

21. The method of claim 20, wherein there is included the further step of preparing the vessel by placing a plurality of evenly spaced support beams upon the deck of said vessel, said support beams situated in lateral relationship to the longitudinal axis of the vessel, and in step "d" the step of placing said intermodal shipping container upon said support beams situated upon said deck of the vessel.

22. The method of claim 20, wherein there is further included after step "f" the additional step of providing a rear cable puller situated adjacent to the stern of the vessel, and the additional step, following step "h", of utilizing said rear cable puller to pull cable from said first or second cable bin into a body of water.

23. The method of converting a vessel to provide seismic cable handling capabilities, the vessel having a longitudinal axis, a bow, stern and a deck, comprising the steps of:

a) providing an intermodal shipping container which is convertible to a platform work surface forming a modular seismic cable handling system, the container comprising first and second ends, a bottom wall, and first and second sidewalls, each of said sidewalls having an upper edge and a lower edge, said lower edges of said sidewalls communicating with said bottom wall forming a floor surface, said intermodal shipping container further comprising:

a top wall having a length, said top wall further comprising latch means for disengaging said top wall along its length;

hinge means associated with said lower edges of said sidewalls, allowing said sidewalls to be hingedly manipulated by selectively disengaging said latch means associated with said top wall, so as to pivot said first and second sidewalls to rest in general planar relationship with said bottom wall, forming a work platform having first and second sidewalls formed by first and second top wall members, respectively;

a dividing wall emanating from said floor surface of said bottom wall, said dividing wall having a length;

a trolley assembly slidingly engaged to said dividing wall, so as to allow said trolley assembly to be slidingly motivated along the length of said dividing wall, said trolley assembly supporting a floating cable puller;

b) transporting said intermodal shipping container to the vicinity of said vessel;

c) loading said intermodal shipping container upon the deck of said vessel;

d) positioning said intermodal shipping container upon the deck of said vessel such that said dividing wall of said intermodal shipping container is generally aligned with said longitudinal axis of said vessel, and first end of said intermodal shipping container is situated generally adjacent to the stern of the vessel;

e) hingedly manipulating said sidewalls of said intermodal shipping container by selectively disengaging said latch means associated with said top wall, so as to pivot said first and second sidewalls to rest in general planar relationship with said bottom wall upon said deck of said vessel, forming a work platform having first and second sidewalls formed by first and second top wall members, forming first and second cable bins divided by said dividing wall;

f) positioning said trolley assembly along said dividing wall;

g) utilizing said floating cable puller to pull seismic cable into said first cable bin; and h) utilizing said floating cable puller to pull seismic cable into said second cable bin.

24. The method of claim 23, wherein there is included the further step of preparing the vessel by placing a plurality of evenly spaced support beams upon the deck of said vessel, said support beams situated in lateral relationship to the longitudinal axis of the vessel, and in step "d" the step of placing said intermodal shipping container upon said support beams situated upon said deck of the vessel.

25. The method of claim 23, wherein there is further included after step "f" the additional step of providing a rear cable puller situated adjacent to the stern of the vessel, and the additional step, following step "h", of utilizing said rear cable puller to pull cable from said first or second cable bin into a body of water.

26. An intermodal shipping container which is convertible to a platform work surface, the container comprising first and second ends, a bottom wall, and first and second sidewalls, each of said sidewalls having an upper edge and a lower edge, said lower edges of said sidewalls communicating with said bottom wall, said intermodal shipping container further comprising:

a top wall having a length, said top wall further comprising latch means for disengaging said top wall along its length;

hinge means associated with said lower edges of said sidewalls, allowing said sidewalls to be hingedly manipulated by selectively disengaging said latch means associated with said top wall, so as to pivot said first and second sidewalls to rest in general planar relationship with said bottom wall, forming a work platform having first and second sidewalls formed by first and second top wall members, respectively.

27. An intermodal shipping container which is convertible to a platform work surface forming a modular seismic cable handling system, the container comprising first and second ends, a bottom wall, and first and second sidewalls, each of said sidewalls having an upper edge and a lower edge, said lower edges of said sidewalls communicating with said bottom wall forming a floor surface, said intermodal shipping container further comprising:

a top wall having a length, said top wall further comprising latch means for disengaging said top wall along its length;

hinge means associated with said lower edges of said sidewalls, allowing said sidewalls to be hingedly manipulated by selectively disengaging said latch means associated with said top wall, so as to pivot said first and second sidewalls to rest in general planar relationship with bottom wall, forming a work platform having first and second sidewalls formed by said first and second top wall members, respectively;

a dividing wall emanating from said floor surface of said bottom wall, said dividing wall having a length;

a trolley assembly slidingly engaged to said dividing wall, so as to allow said trolley assembly to be slidingly motivated along the length of said dividing wall, said trolley assembly supporting a floating cable puller.

* * * * *